(12) United States Patent
Feuer et al.

(10) Patent No.: US 9,551,152 B2
(45) Date of Patent: Jan. 24, 2017

(54) ROOFING METHOD AND APPARATUS

(71) Applicants: Avi Feuer, Portland, OR (US); Ari Allyn-Feuer, Ypsilanti, MI (US)

(72) Inventors: Avi Feuer, Portland, OR (US); Ari Allyn-Feuer, Ypsilanti, MI (US)

( * ) Notice: Subject to any disclaimer, the term of this patent is extended or adjusted under 35 U.S.C. 154(b) by 0 days.

(21) Appl. No.: 13/802,799

(22) Filed: Mar. 14, 2013

(65) Prior Publication Data
US 2014/0259972 A1    Sep. 18, 2014

(51) Int. Cl.
| | |
|---|---|
| *E04D 7/00* | (2006.01) |
| *E04D 11/02* | (2006.01) |
| *E04D 13/04* | (2006.01) |
| *E04D 13/15* | (2006.01) |
| *E04D 13/155* | (2006.01) |
| *E04D 3/40* | (2006.01) |
| *E04D 11/00* | (2006.01) |

(52) U.S. Cl.
CPC . *E04D 7/00* (2013.01); *E04D 3/40* (2013.01); *E04D 11/002* (2013.01); *E04D 11/02* (2013.01); *E04D 13/0459* (2013.01); *E04D 13/155* (2013.01); *Y02B 80/32* (2013.01)

(58) Field of Classification Search
CPC .......... E04D 11/02; E04D 13/155; E04D 7/00; E04D 13/0459
USPC ...... 52/58, 97, 408, 409, 411, 741.1, 746.11
See application file for complete search history.

(56) References Cited

U.S. PATENT DOCUMENTS

| | | | |
|---|---|---|---|
| 3,763,605 A * | 10/1973 | Freeman | E04D 7/00 156/71 |
| 4,746,365 A | 5/1988 | Babcock | |
| 5,171,818 A | 12/1992 | Wilson | |
| 5,251,411 A * | 10/1993 | Kelley | E04D 13/064 156/290 |
| 5,253,461 A * | 10/1993 | Janoski | E04D 11/02 156/71 |
| 5,740,647 A * | 4/1998 | Kelly | E04D 11/02 52/199 |
| 6,209,283 B1 * | 4/2001 | Folkersen | E04D 1/26 52/409 |
| 7,779,595 B2 | 8/2010 | Polk, Jr. | |
| 7,793,480 B2 | 9/2010 | Gembala | |
| 2003/0005658 A1* | 1/2003 | Folkersen | 52/408 |
| 2003/0145546 A1* | 8/2003 | Georgeau | E04D 5/12 52/408 |

(Continued)

OTHER PUBLICATIONS

Edward M. Petrie, MS Polymers in "Hybrid" Sealants, www.adhesives.org, (c) 2010, pp. 1-8, EMP Solutions, The Adhesive and Sealant Council, Inc., Bethesda, MD USA.

ART WEBB, Applying Plural Component Spray, Webinar Series, (c) 2012, pp. 1-100, The Society for Protective Coatings, Pittsburgh, PA USA.

(Continued)

*Primary Examiner* — Ryan Kwiecinski

(57) ABSTRACT

In an embodiment, a method includes applying a liquid plural component polymer to a sloped roof to form a protective surface that inhibits moisture seepage to the roof sheathing. In some embodiments, the plural component polymer may be a polyurea compound having a hardening time that is less than approximately 10 minutes. In some embodiments, one or more of the components may be aerated prior to application to the roof substrate. In some embodiments, one or more polystyrene panels may be affixed to the sloped roof prior to application of the liquid plural component polymer. Other embodiments are described and claimed.

8 Claims, 12 Drawing Sheets

(56) References Cited

U.S. PATENT DOCUMENTS

| | | | |
|---|---|---|---|
| 2004/0016201 A1* | 1/2004 | Folkersen | E04D 1/26 52/741.4 |
| 2004/0025462 A1* | 2/2004 | Meier | B32B 15/06 52/412 |
| 2005/0218547 A1 | 10/2005 | Roche | |
| 2005/0244626 A1* | 11/2005 | Leslie | B32B 5/18 428/304.4 |
| 2006/0053717 A1* | 3/2006 | Kelly | E04D 13/1643 52/408 |
| 2006/0054059 A1 | 3/2006 | Dubey | |
| 2006/0240243 A1* | 10/2006 | Leslie | 428/304.4 |
| 2007/0066786 A1 | 3/2007 | Hanson, Jr. | |
| 2007/0261346 A1* | 11/2007 | Kelly | E04D 13/155 52/408 |
| 2009/0241450 A1 | 10/2009 | Italiane | |
| 2010/0011691 A1* | 1/2010 | Anaya | E04D 1/265 52/411 |
| 2010/0086697 A1 | 4/2010 | Pjatikin | |
| 2011/0215165 A1 | 9/2011 | Davis | |

OTHER PUBLICATIONS

Graco, Fast-Set Plural-Component Equipment and Accessories, OEM Equipment Literature, © 2002-2009, pp. 1-24, Rev. E 7/09, Graco Inc., Minneapolis, MN USA.

NACE International Introduction to Thick-Film Polyurethanes, Polyureas, and Blends, Technical Committee Report, (c) 1998, pp. 1-9, Item No. 24197 NACE International Publication 6A198, NACE International, Houston, TX USA.

Dudley J. Primeaux II, Application of 100% Solids, Plural Component Aliphatic Polyurea Spray Elastomer Systems, Journal of Protective Coatings & Linings (JPCL) Magazine, (c) 2001, pp. 26-32, Mar. 2001 Edition, The Technology Publishing Networic, Pittsburgh PA USA.

Dudley J. Primeaux Ii, Polyurea vs Polyurethane & Polyurethane/Polyurea: What's the Difference?, Presentation Polyurea Development Association (PDA) Conference, (c) 2004, pp. 1-20, Primeaux Associates LLC, Elgin, TX USA.

Specialty Products, Inc., About Polyurea, Polyurea Education, (c) 2015, pp. 1-4, specialty-products.com/about-polyurea/, Specialty Products, Inc., Lakewood, WA USA.

* cited by examiner

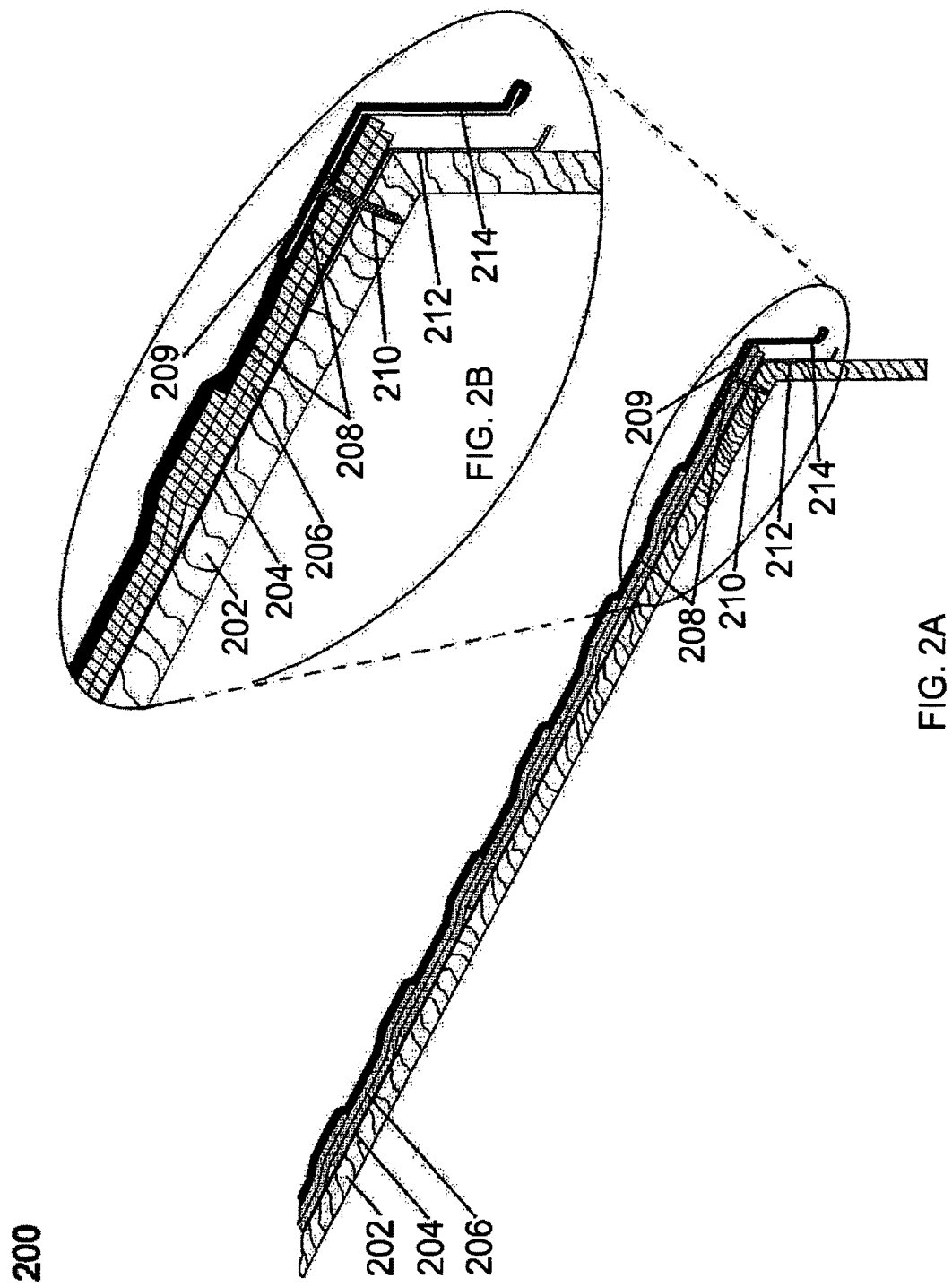

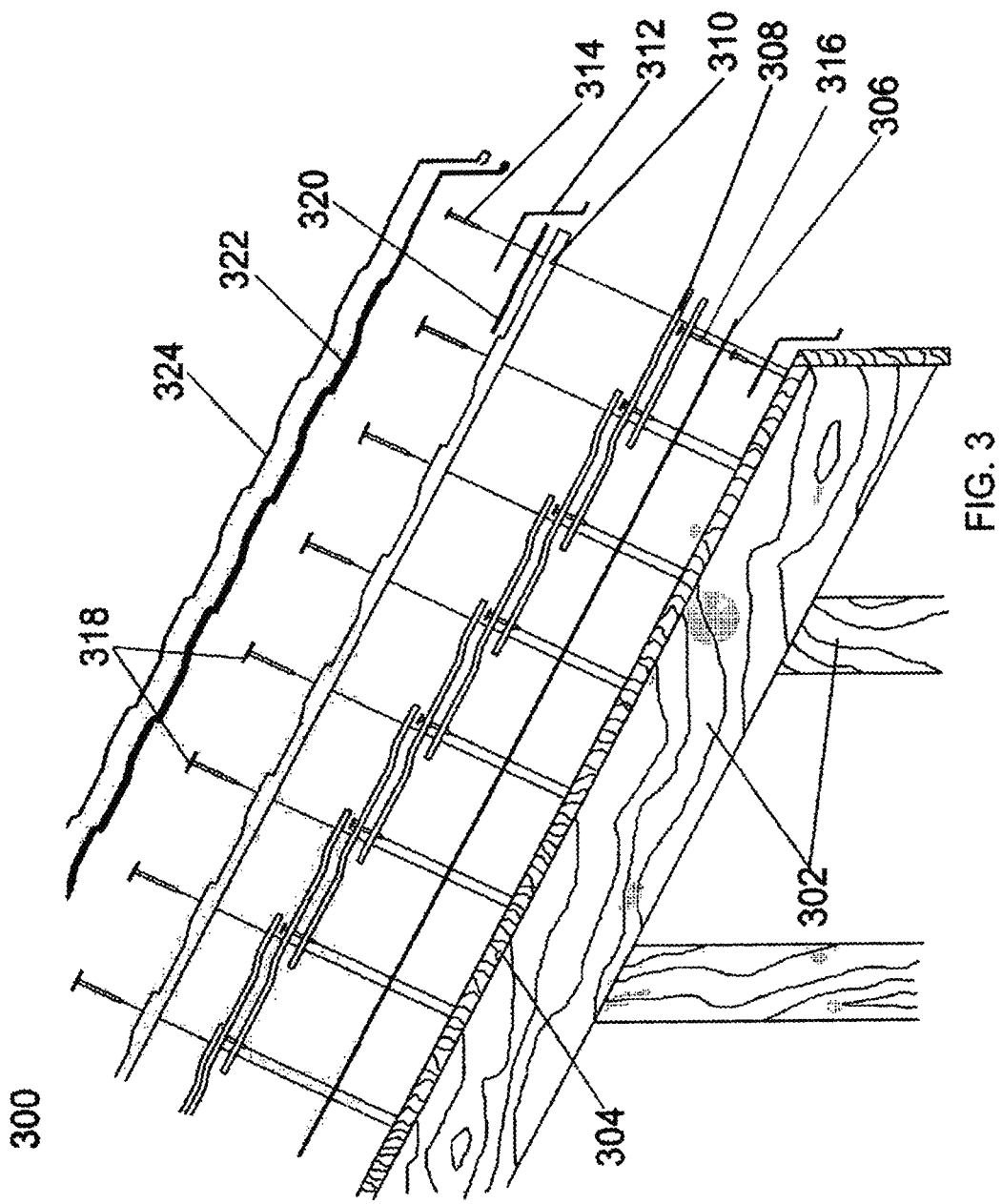

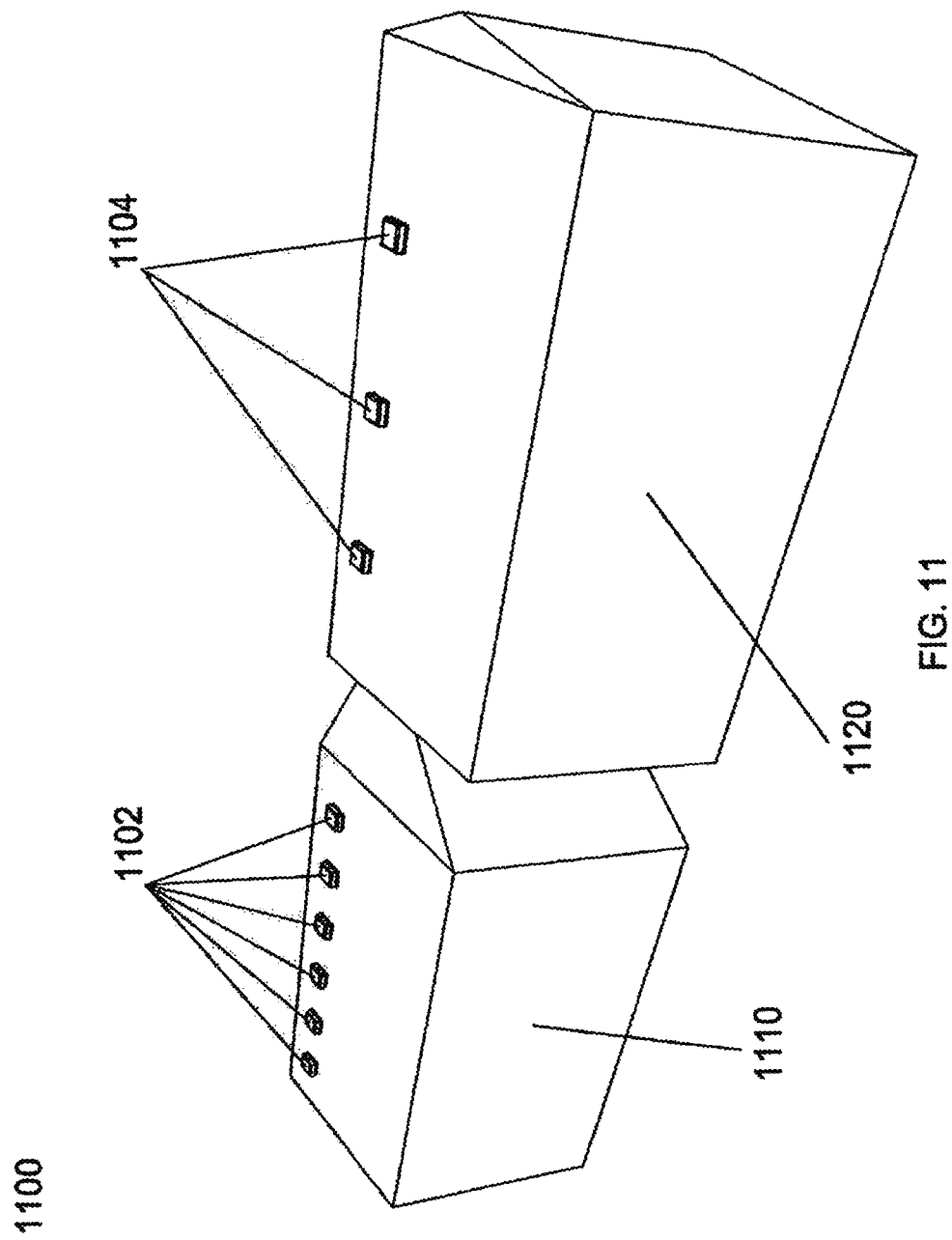

ROOFING METHOD AND APPARATUS

BACKGROUND

Building roofs, including roofs of family dwellings, are often constructed with shingles, e.g., "composition" shingles. Composition material may include a tar-impregnated fibrous base, e.g., fiberglass, and may be coated with sand-like or similar materials. As a result of weathering and wear due to exposure to sunlight, heat, cold, and moisture, composition shingles ("tiles") degrade, becoming brittle and porous. Brittle and/or porous shingles can cause moisture leaks, and may eventually become detached from the roof.

Improvements in roofing materials can increase roof life and effectiveness to shield a house from weather elements such as moisture (e.g., rain, snow, hail, etc.), sun, wind, ambient temperature, etc.

BRIEF DESCRIPTION OF THE DRAWINGS

FIGS. 2A and 2B are representations of a cross-section of a portion of a roof, according to an embodiment.

FIG. 3 is a representation of a cross-section of a portion of a roof, according to another embodiment.

FIG. 11 is representation of a roof, according to another embodiment.

DETAILED DESCRIPTION

Methods and apparatus are presented to make a protective surface that forms at least part of a roof of a structure. The protective surface may be formed by applying a plural component polymer liquid to a roof substrate of a roof. In an embodiment, the non-aqueous based liquid includes a polyurea compound that, upon application, solidifies to produce a solid surface that adheres to the roof substrate. The plural component polymer liquid may have a fast hardening time, e.g., of the order of seconds to minutes after application, permitting a substantially uniform application to a sloped roof without thinning due to, e.g., drift of the liquid (e.g., as a result of gravitational force). Other embodiments are described.

Figure 1:
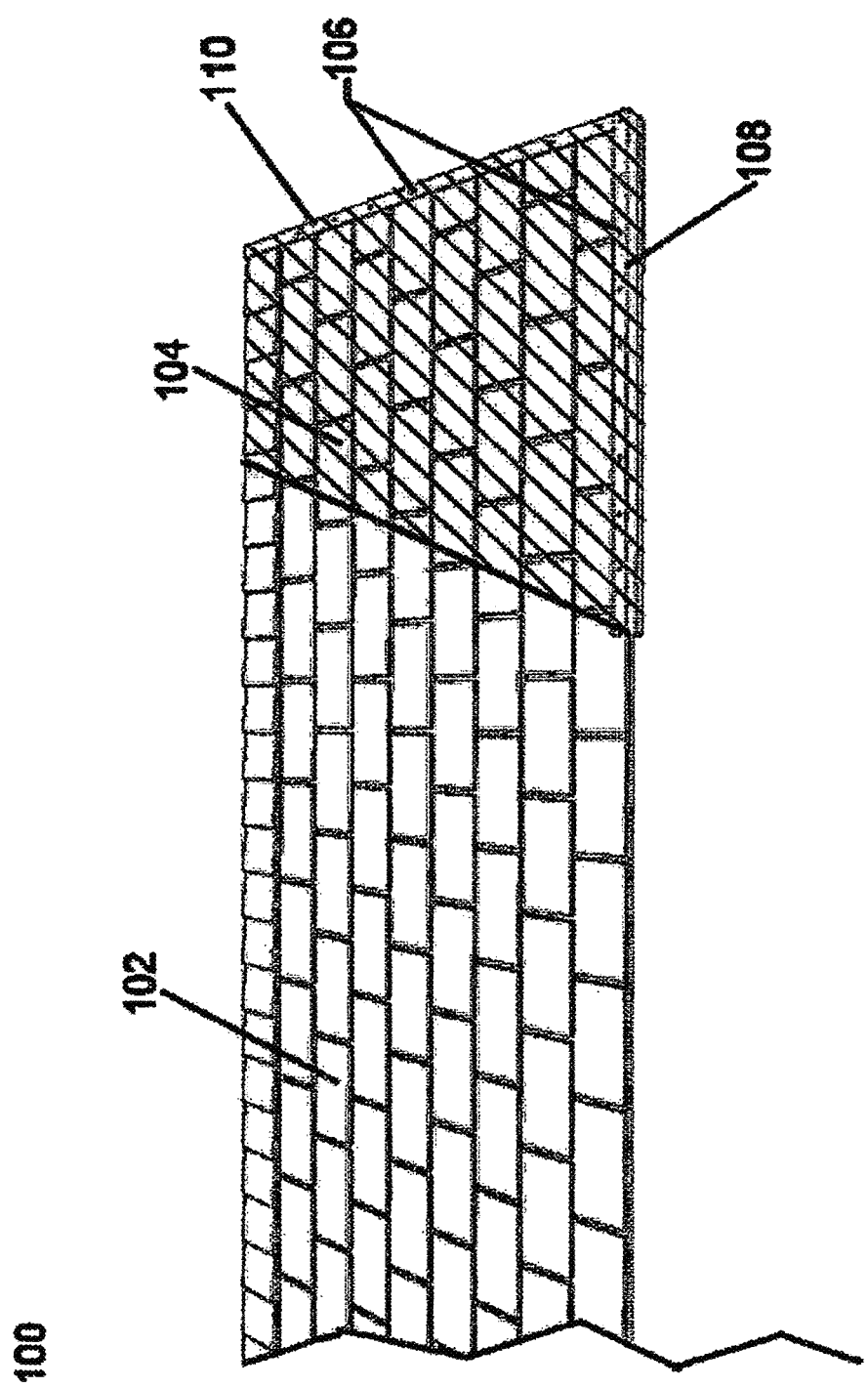
FIG. 1 is a representation of a roof, according to an embodiment.

Referring to FIG. 1, shown is a representation 100 of a sloped roof, such as a roof of a building, e.g., a house, or another type of building. The roof may include a substrate 102, a coating 104, fasteners 106, drip edge flashing 108, and rake edge flashing 110. A sloped roof typically has a slope (e.g., rise over run) of 1/24 or greater. More typically a sloped roof has a slope of 1/12, and often sloped roofs have a slope of 3/12 or greater. Sloped roofs may promote runoff of moisture, e.g., rain, snow, etc., and may be a feature of houses such as family dwellings, etc.

The substrate 102 may include underlayment, sheathing, shingles, other substrate materials, and the substrate 102 may comprise wood, tar-based covering, and/or other covering materials. The coating 104 may be a non-aqueous material, such as a polyurea compound and/or polyurethane-type material. The coating 104 may serve as a barrier membrane to protect the substrate 102 from moisture, sun, and other wear agents that may cause a breakdown of the roof, e.g., inability to protect contents of the building from e.g., moisture, sun, and other undesired external agents. In some embodiments, the coating 104 may be applied in new construction, e.g., directly over roof sheathing (e.g., plywood and/or oriented strand board). Additionally, the coating 104 may be applied to an existing roofing assembly to protect the existing roofing assembly from, e.g., weathering agents, e.g. rain, wind, snow etc.

The drip edge flashing 108, rake edge flashing 110 and other flashing (not shown, including but not limited to flashing applied to conjoining planes of a roofing surface, and protrusions such as chimneys, plumbing vents, other vents, and other protrusions) may be integrated with other portions of the roof. Integration of the flashing with the other portions of the roof may be accomplished by, e.g., inclusion of the coating 104 between the flashing 108 and the substrate 102, and application of plural component polymer material to the flashing after the coating 104 has been applied to the substrate 102 in a layered, or "sandwich-like" fashion, or by combinations thereof, and may be used, in some embodiments, as part of a sloped roof and/or as part of a substantially flat roof (e.g., non-sloped roof having a slope of less than 1/12 and/or less than 1/24).

Figure 2C:
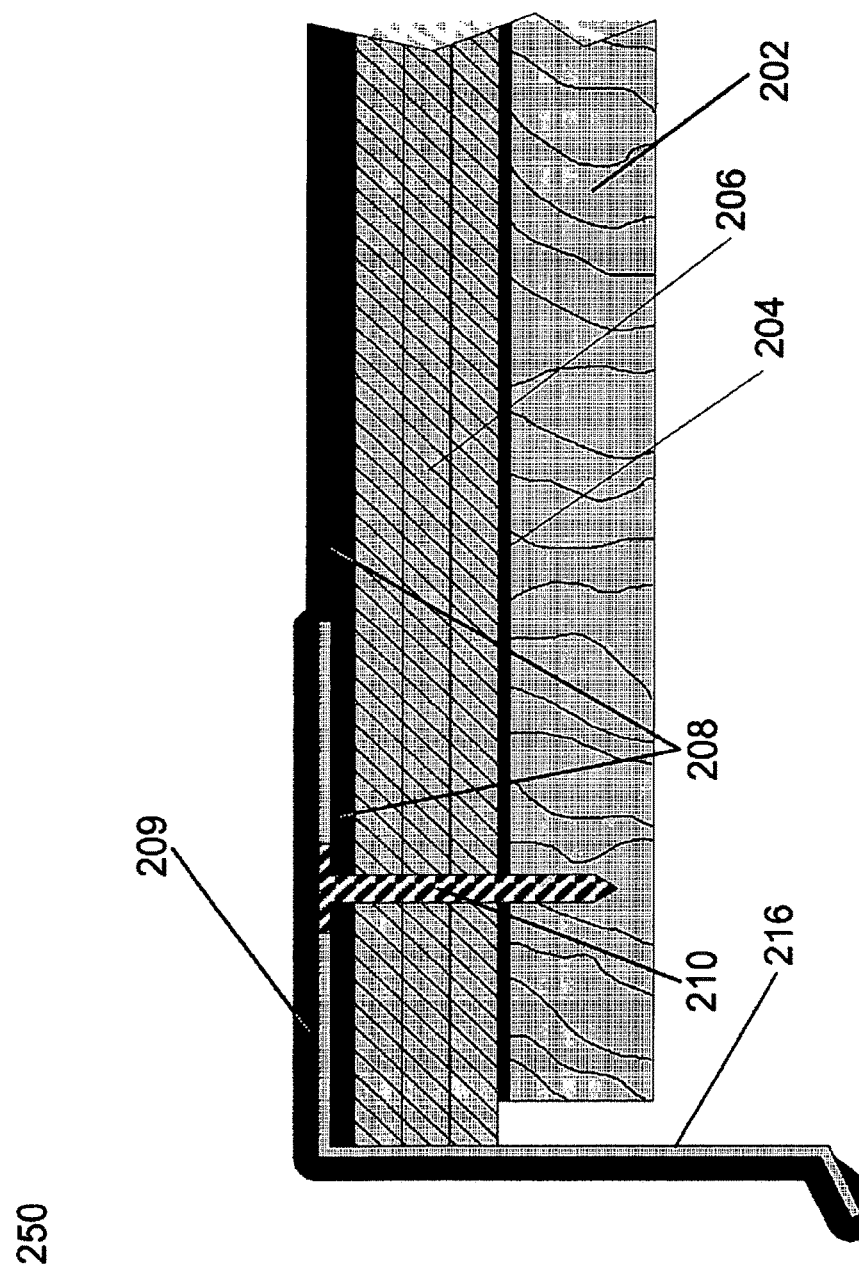
FIG. 2C is a representation of a cross-section of a portion of a roof, according to another embodiment.

Referring to FIGS. 2A and 2B, shown is a representation 200 of a portion of roof that is retrofitted, according to an embodiment. A sheathing 202 may be affixed to members of a roof frame, e.g., to frame studs (e.g., members (e.g., 2"×4" or other dimensioned) that may be made of wood, metal, plastic, or another material). In an embodiment, underlayment 204 may be affixed to the sheathing 202, the underlayment 204 typically made of a malleable material such as felt, tar paper, a fibrous blanket-like material, or another type of covering. Fastened to the underlayment 204 may be roof shingles 206, which may be made of wood, metal, concrete, tile, a composite material such as tar-impregnated fibrous material coated in aggregate (e.g., a granular, or sand-like material), or other roofing materials, and may serve as an outer surface of the roof prior to a retrofit process that may include application of the plural component polymer to the outer surface.

In the retrofit process, a membrane layer 208, e.g., plural component polymer material, may be applied as a liquid that may polymerize to form a solid water-repellant surface. In an embodiment, the membrane may be applied by, e.g., spraying the plural component polymer in liquid form onto exposed surfaces of the existing roof including the roof shingles 206, and onto flashing material including a drip edge flashing 212, which may be affixed (as part of the existing roof and prior to retrofit) to the roof shingles 206 and to the sheathing 202. In an embodiment, a rapidly hardening plural component polymer liquid may be applied to form the membrane, e.g., hardening (e.g., via polymerization) to occur in a time period (e.g., beginning at a time that the liquid leaves an application apparatus, e.g., spray gun) of several seconds to several minutes and less than approximately 10 minutes. By employing a rapidly hardening plural component polymer (e.g., a polyurea compound), the layer applied to the roof may tend to have a more uniform thickness over the extent of the membrane than, e.g. through use of a substance with a long hardening time (e.g., one hour or longer) because the plural component polymer that forms the membrane will harden before significant drift of the liquid occurs due to gravitational effects that would otherwise result in non-uniformity of membrane depth.

In an embodiment, after the membrane layer 208 is applied to the existing roof outer surface, a drip edge flashing 214 and a rake edge flashing 216 (shown in FIG. 2C) may be affixed to the roof structure. The drip edge flashing 214 and the rake edge flashing 216 may be made of, e.g., flashing material such as a shaped metal or other shaped solid, and may be affixed to the previously existing roof structure, the membrane layer 208, the roof shingles 206, the underlayment 204, and the sheathing 202 through use of e.g., mechanical fasteners such as nails, screws, other mechanical fasteners, or other attachment techniques. The drip edge flashing 214 and the rake edge 216 may serve to deflect moisture away from an edge of a retrofitted roof surface formed by, e.g., the membrane layer 208, the roof shingles 206, the roof underlayment 204, and the sheathing 202.

According to an embodiment, a portion of the plural component polymer may be sprayed onto the existent roof structure prior to installing the drip edge flashing 214 and the rake edge flashing 216 (e.g., plural component polymer applied beneath each of the drip edge flashing 214 and the rake edge flashing 216). After application of the plural component polymer to the existent roof structure, the drip edge flashing 214 and the rake edge flashing 216 may be affixed, and additional plural component polymer 209 may be applied to coat the drip edge flashing 214 and rake edge flashing 216. The additional plural component polymer application 209 may further extend to cover a portion of the membrane layer 208, which can result in the drip edge flashing 214 and the rake edge flashing 216 being integrated within the (extended) membrane 208 and the membrane 209 and including the mechanical fasteners that attach flashing (drip edge flashing 214 and rake edge flashing 216) to the sheathing 202. Sandwiching at least a portion of the flashing between the membrane 208 and the membrane 209 may serve to anchor the membrane 208 to the roof assembly to prevent lifting by, e.g., wind or other weather elements. Integration of the flashing (drip edge flashing 214 and rake edge flashing 216) between the membrane 208 and the membrane 209 may serve to protect the flashing from deterioration due to, e.g., moisture and/or other weathering agents. In some embodiments, use of the "sandwich" technique to install flashing may be applicable to sloped roofs and to non-sloped roofs.

FIG. 2B shows another cross-sectional view 250, along a rake edge of the retrofitted roof of FIG. 2A, according to an embodiment. The rake edge flashing 216 includes flashing material that is coated with the membrane 209 on an outer portion of the rake edge flashing 216, and the rake edge flashing 216 is partially "sandwiched" between portions of the membrane 208 and the membrane 209 to protect otherwise exposed portions of the rake edge flashing 216 from weather elements, e.g., rain, snow, etc. In some embodiments, use of a sandwich or partial sandwich technique to protect flashing and integrate the rake edge flashing into the retrofitted roof may be applied to sloped roofs and to non-sloped roofs. Note that the embodiments described herein are not limiting and additional embodiments are contemplated.

Referring to FIG. 3, shown is a cross-sectional view of a roof 300, according to an embodiment. The roof 300 may include a frame 302 that may include a plurality of vertical studs and a plurality of roof support members e.g. joists and/or trusses that are affixed to the vertical studs and that form an underlying support structure. Affixed to the roof support members may be a roof deck 304 that can include substantially planar sheathing material, such as wood or wood-based material e.g. oriented strand board (OSB), or other sheathing material. Underlayment 306 and roof shingles 308 may be affixed to the roof deck 304 via, e.g. mechanical fasteners 316. The roof shingles 308 may have constituted an outer roof surface of the roof prior to a roof retrofit. The roof shingles 308 may be constructed of composition material (e.g., tar and aggregate mixture, or other composition), wood, slate, concrete, earthen tile, metal, or another roofing material or combination thereof.

One or more panels 310 may be affixed to the roof shingles via, e.g., mechanical fasteners 318 and/or adhesive. In an embodiment, the panels 310 may be constructed from a polystyrene foam, or another solid plastic material, and the panels 310 may be shaped prior to installation over the roof shingles. For example, the panels 310 may be shaped to resemble one or more roof shingles, or another conventional roofing system such as standing seam metal roofing, tile, slate etc. Shaping of the panels 310 may increase marketability of a retrofit of the roof, because the shaped panels may provide the retrofitted roof with an appearance of a conventional shingle roof or other conventional roof shape. Similarity of the appearance of the retrofitted roof to a conventional shingle roof may significantly enhance marketability of the retrofitted roof, where the roof is retrofitted according to embodiments presented herein. Pre-formed shaped panels (made from, e.g., polystyrene or other material) may be used in formation of sloped roofs and non-sloped roofs, in some embodiments.

At least a portion of an outer surface of the panels 310 may be coated with a first membrane layer 320, which may be is situated at least between the panels 310 and flashing 312 that may be affixed to the portion of the panels 310 and optionally to the shingles 308 and the roof deck 304 by, e.g. mechanical fasteners 314. A first layer 320 of membrane formed from a plural component polymer (e.g., polyurea) may encase the flashing 312 and may promote adhesion of the flashing 312 to a second layer of membrane 322 (formed from the plural component polymer (e.g., polyurea), forming a structure that includes flashing 312 and membrane 322. Mechanical fastening of the flashing 312 to the roof deck 304 can serve to anchor the membrane layers 320 and 322 to the roof deck 304, with the flashing 312 sandwiched between the membrane layers 320 and 322. This sandwiching of the flashing 312 between the membrane layers 320 and 322 may prevent deterioration of the flashing 312 due to weathering agents that might otherwise directly contact the flashing. Additionally, the flashing and membrane in combination may prevent water and/or other weathering elements from reaching any portion of the roof assembly that is beneath the membrane/flashing combination that includes the membrane layers 322 and 320, flashing 312 and fasteners 314. The first membrane layer 320 may partially or completely coat the flashing 312, and may extend to at least the portion of other surfaces of the panels 310. In an embodiment, the first membrane layer 320 may be applied to the flashing 312 prior to affixing the flashing to the panels 310. In another embodiment, the first membrane layer 320 may be applied portions (e.g., outer surface of the panels 310), after which the flashing 312 may be affixed to the panels 310.

After the flashing 312 is affixed to the panels 310, the second membrane layer 322 may be applied to exposed portions of the panels 310 and to exposed portions of the flashing 312. In an embodiment, the second membrane layer 322 may be applied in a liquid form that hardens to form a barrier to protect underlying components from weathering agents such as moisture, sun, etc. The first membrane layer and the second membrane layer may be a non-aqueous material such as a polyurethane, polyurea, or other plural component polymer compound that may be applied in liquid form and that hardens to form the second membrane layer 322. In an embodiment, the second membrane layer may be formed from a quickly hardening (e.g., quickly polymerizing) material, e.g., having a hardening time of less than approximately 10 minutes from time of application, and in some embodiments, having a respective hardening time of less than approximately 2 minutes, and in some embodiments, having an effective respective hardening time of less than approximately 30 seconds.

After application of the second membrane layer 322, optionally a third membrane layer (e.g., an ultraviolet blocking layer) 324 may be applied to the second membrane layer, e.g., as a liquid substance that hardens to form an ultraviolet-protecting surface that filters out or reflects ultraviolet light that may impinge on an outer surface of the ultraviolet blocking layer 324. The third membrane layer 324 may be a polyurethane compound that can filter ultraviolet light and that effectively withstands weathering effects, e.g., moisture, heat, etc. over a multi-year life span that may be expected of the retrofit. The third membrane layer 324 may also contain color pigments to color the roof surface, which may provide may provide color (dark or light) that reflects or absorbs heat, and may enhance the roof aesthetically. The reflective or absorptive properties of the third membrane layer 324 may result in energy savings and may improve comfort in the interior of the building, e.g., attic temperature. Use of multiple layers, e.g., polyurea, polyurethane, and/or other plural component polymer layers, may be applicable to sloped roofs and to non-sloped roofs, in some embodiments. Note that the embodiments described herein are not limiting.

Figure 4:
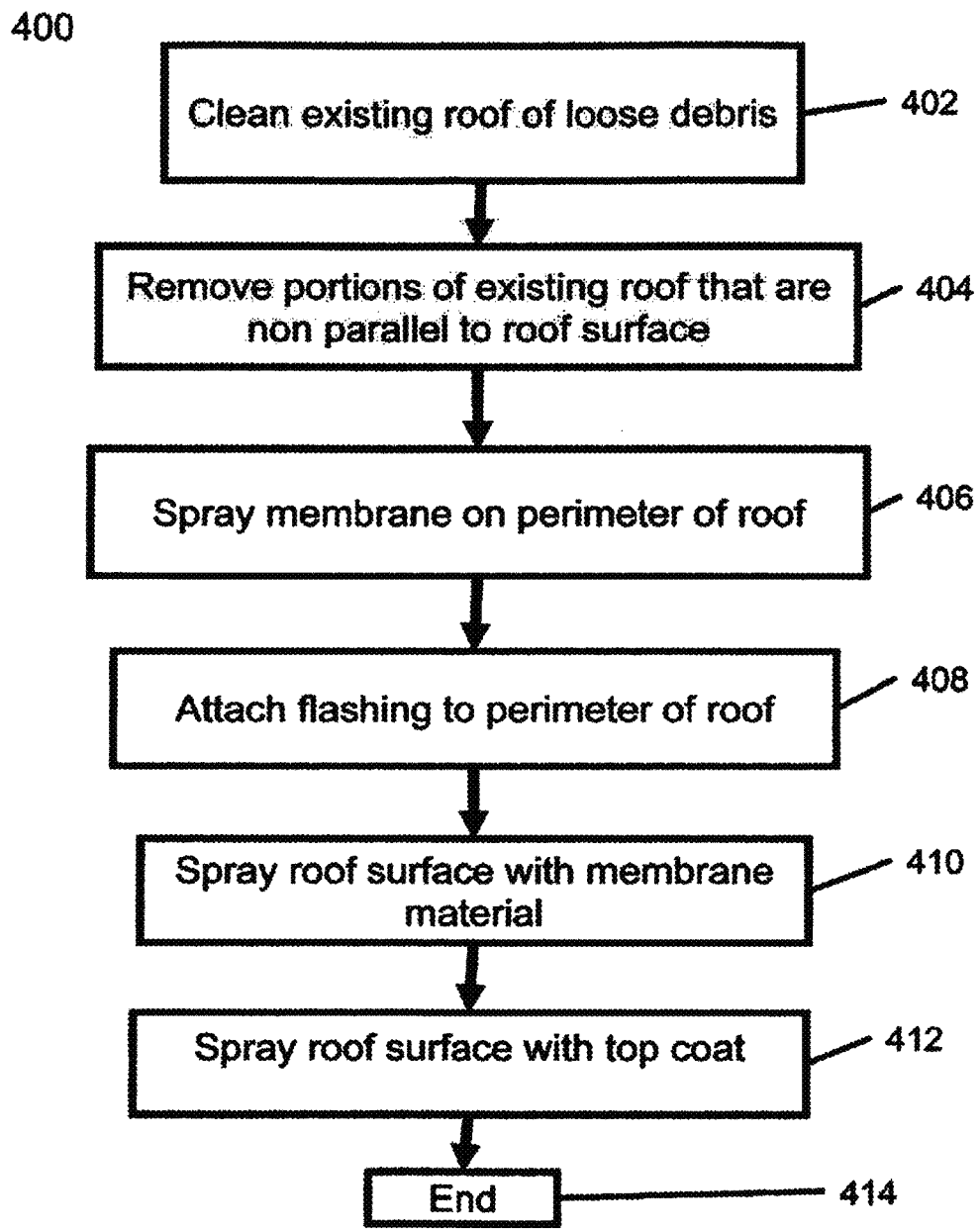
FIG. 4 is a flow diagram of a method of making a roof, according to an embodiment.

Turning to FIG. 4, shown is a flow chart 400 of a method of making a roof, according to an embodiment. At block 402, a substrate roof outer surface is cleaned of loose debris. The cleaning may include sweeping debris from the roof outer surface (e.g., via forced air, mechanical sweeping/cleaning techniques, etc.). Additionally, the cleaning may include surface preparation of the substrate roof outer surface, which may include, e.g., abrasion of the substrate roof outer surface through, e.g., sand blasting, surface preparation by chemical agents, or other surface preparation techniques to ensure adhesion of a membrane layer to the substrate roof outer surface. Continuing to block 404, preparation may include removal of one or more sections of the substrate roof are non-parallel to other portions of the substrate roof outer surface (e.g., not substantially co-planar with other portions of the substrate roof).

Advancing to block 406, a first membrane layer (e.g., a plural component polymer compound, e.g., polyurea) may be applied, in liquid form, to a perimeter strip of the substrate roof. In an embodiment, the application may be through a spray technique, described herein. In an embodiment, the plural component polymer compound may have a relatively short hardening time (e.g., of the order of one or more second, up to approximately 10 minutes). In an embodiment, the perimeter strip includes an outer strip of the substrate roof that is at least as wide as a flashing strip to be affixed to the substrate roof at perimeter portions of the substrate roof and may include including dormers and regions surrounding protrusions, e.g. vents, chimneys etc. In an embodiment, the perimeter strip has a longitudinal extent that is at least twice a longitudinal extent of the flashing strip, so that when the flashing strip is affixed to the perimeter strip of the substrate roof the first membrane layer extends beyond the longitudinal extent of the flashing strip, providing a moisture barrier between the substrate roof and the flashing strip and allowing the flashing to be encased between two layers of the sprayed membrane material.

Moving to block 408, the flashing strip may be affixed to the substrate roof at the perimeter strip, e.g. rake edges, drip edges, dormer edges etc., through use of mechanical fastening techniques. Each section of flashing is to contact the first membrane and may be fastened to the underlying roof via mechanical fasteners that pierce the first membrane to the substrate roof and roof decking.

Proceeding to block 410, a second membrane layer (e.g., a plural component polymer compound, e.g., polyurea) may be applied, in liquid form, to outer surfaces of the substrate roof and affixed flashing, e.g., via a spraying technique. The second membrane layer may harden to form a retrofitted roof outer surface that protects the underlying layers (e.g., substrate roof and flashing) from degradation due to, e.g., weathering agents, etc. Continuing to block 412, the second membrane may optionally be coated with a top coat (e.g., a plural component polymer compound, e.g., polyurethane) to protect the second membrane and substrate roof from, e.g., effects of ultraviolet light, and to provide reflectivity and color choice to enhance aesthetics of the retrofitted roof. In an embodiment, one or more to the membrane layers may have brief hardening times that counteract a tendency to non-uniformity of layer thickness due to liquid drift, e.g., as a result of gravitational effects. The method ends at 414. The method may apply to sloped roofs and also to non-sloped roofs, in various embodiments.

Figure 5:
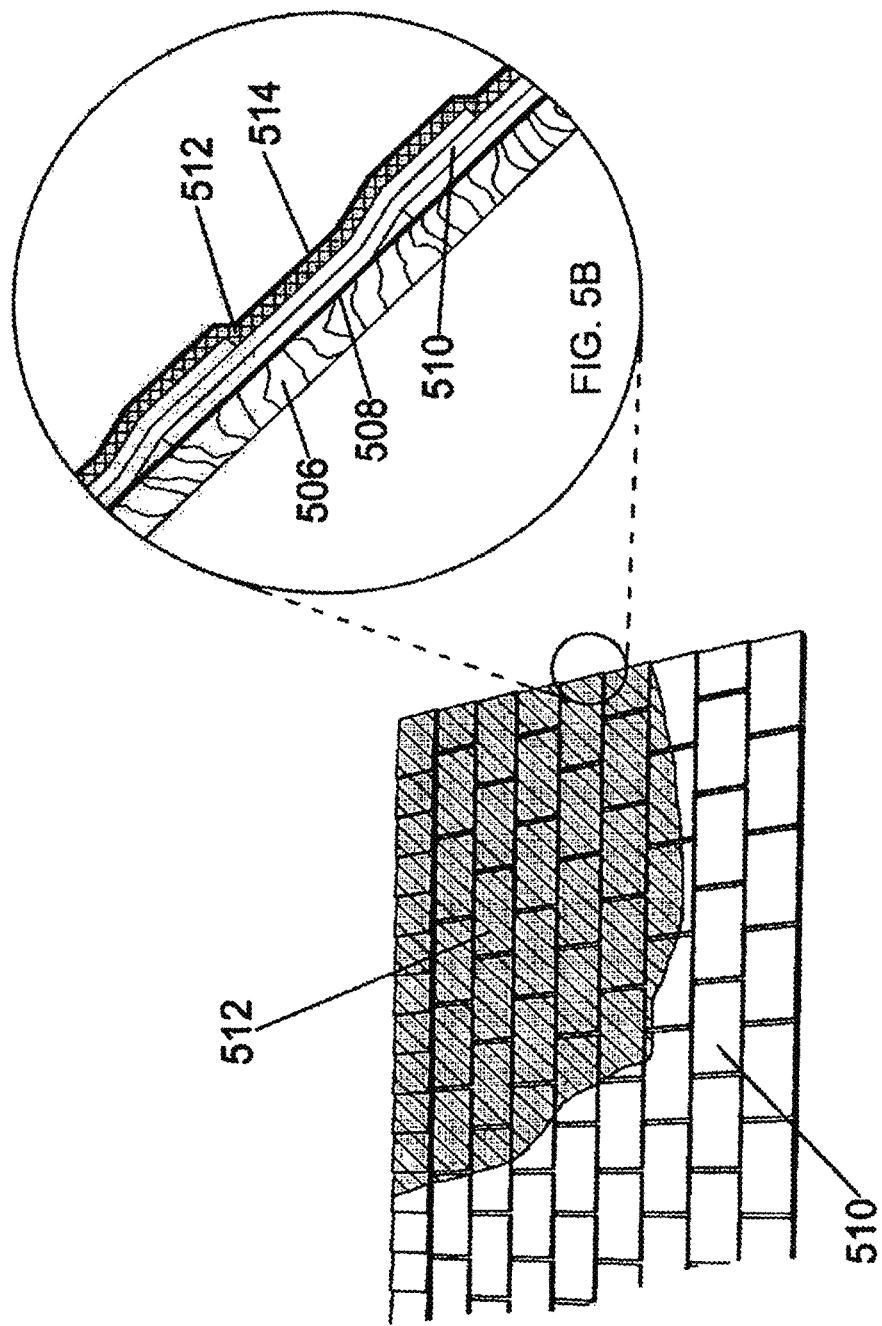
FIGS. 5A and 5B are representations of a cross-section of a portion of a roof, according to another embodiment.

Turning to FIGS. 5A and 5B, shown is a cross sectional view of a sloped roof according to an embodiment. The roof may include a substrate that can include shingles 510 that may be made of a composition material such as a combination of petroleum-based tar and aggregate (e.g., sand), wooden shakes, slate shingles, etc. For example, the shingles 510 may have served as an exterior surface in a previous roof installation that is being re-roofed. Re-roofing may be warranted due to, e.g., moisture leakage, cracking of the shingles, missing portions of the shingles due to, e.g., weathering agents such as moisture (e.g., rain, snow, ice, etc.), sun, wind, etc.

A membrane layer 512 that can serve as an outer layer of the roof may be formed from, e.g., a non-aqueous plural component polymer membrane, e.g., polyurea or another non-aqueous plural component polymer plastic. The membrane layer 512 may be applied as a liquid to the substrate, and may subsequently harden to form an outer layer that is resistant to weathering agents such as moisture (e.g., rain, snow, ice, hail, etc.), and that is resistant to some weathering agents such as sun, wind, etc. The membrane layer may include a secondary outer layer 514 that can be a color filter material to protect against, e.g., detrimental effects of ultraviolet light and/or other weathering agents. The secondary outer layer 514 may be applied as a liquid and that hardens to form a protective outer layer. For example, the secondary outer layer 514 may be sprayed on as a liquid that can harden, e.g., by polymerization, or by a chemical process, e.g., through chemical reaction with atmosphere (e.g., oxygen). In one embodiment, the secondary outer layer 514 may be a polyurethane compound. Use of several polymer layers may be applicable to non-sloped roofs and to sloped roofs, in some embodiments.

As shown in the cross-sectional view, the roof may include a plurality of layers including a roof sheathing 506 (e.g., plywood, oriented strand board (OSB)), roof underlayment 508 (e.g., tar, felt, flexible plastic sheathing, etc.), roof shingles 510, non-aqueous hardened membrane layer (e.g., polyurea) 512, and optionally colored UV-filter layer 514 (e.g., polyurethane). Flashing (not shown) may be installed after the membrane layer 512 is applied, and the flashing may be integrated into the membrane as described above.

Figure 6:
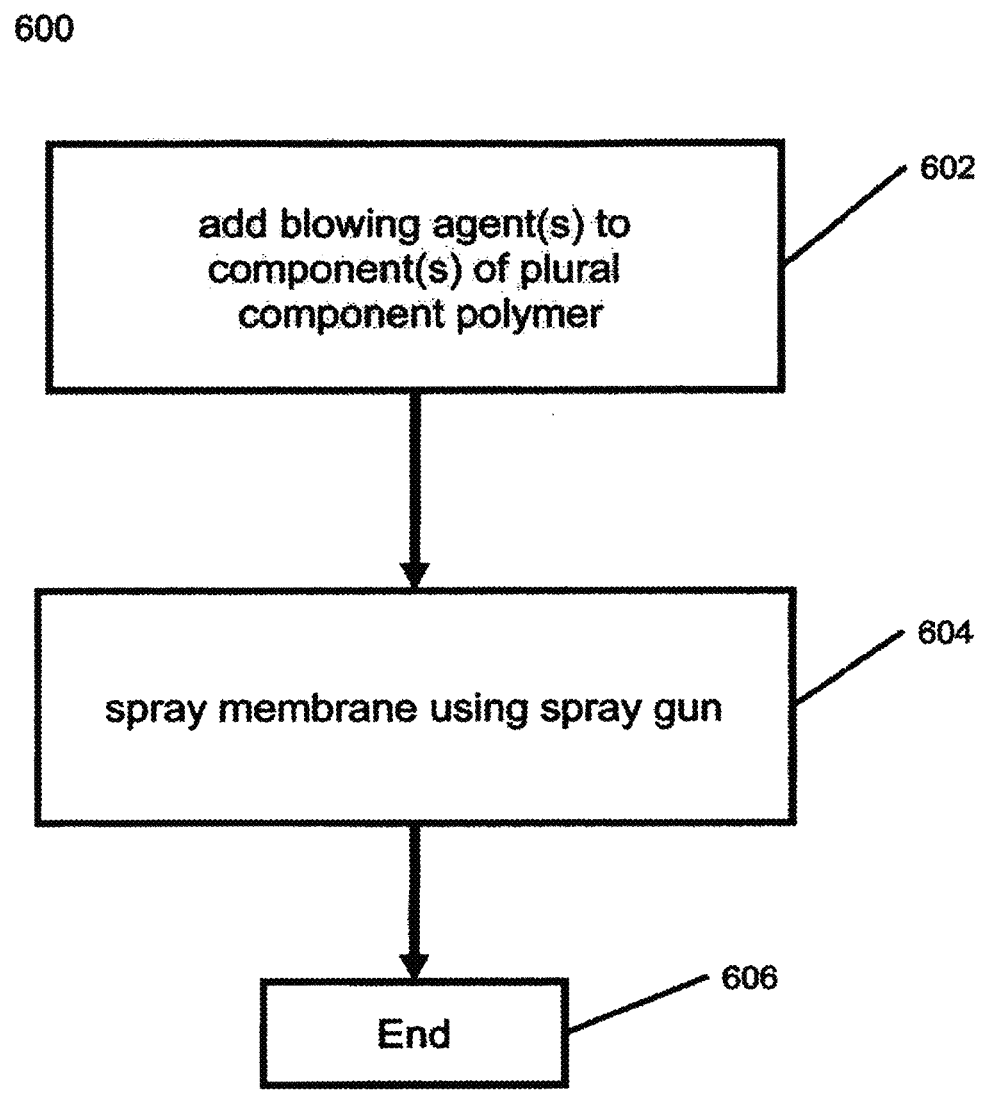
FIG. 6 is a flow diagram of another method of making a roof, according to another embodiment.

Turning to FIG. 6, shown is a flow chart of a method to include an aeration agent (e.g., foaming agent) to a non-aqueous liquid to form a membrane layer of a roof, according to an embodiment. At block 602, the aeration agent may be added to one or more parts of a single or plural-component polymer liquid to be applied as a protective layer of the roof. For example, the plural-component plastic liquid may be a non-aqueous material, such as a polyurea. The aeration agent may be e.g., air, a gas such as nitrogen, oxygen, an inert gas such as argon, helium, etc., a gaseous compound such as nitrogen oxide (NO, $NO_2$, etc.), or another gaseous or volatile liquid material. The aeration agent may serve to promote flow of the multi-component liquid, e.g., into interstices of the layer to which the multi-component liquid is applied to e.g., existing roof shingles, shaped panels that are applied to roof sheathing or existing roof shingles, or applied to another layer. The aeration agent may be added to one or more of the components of the liquid, e.g., prior to application to an existing roof layer. For example, the aeration agent may be added in storage container(s) prior to application via e.g., a spray device such as a spray-gun. In another embodiment, the aeration agent may be introduced to the plastic liquid within the spray device. Moving to block 604, the plastic liquid, with aeration agent, may be applied to the previously installed roof layer, e.g., existing shingles, via the spray device. The method ends at 606. The method 600 may be applied to non-sloped roofs and to sloped roofs, in various embodiments. The aeration agent may change a mass density of the layer formed from the aerated liquid, and may promote thermal insulation characteristics of the layer.

Figure 7:
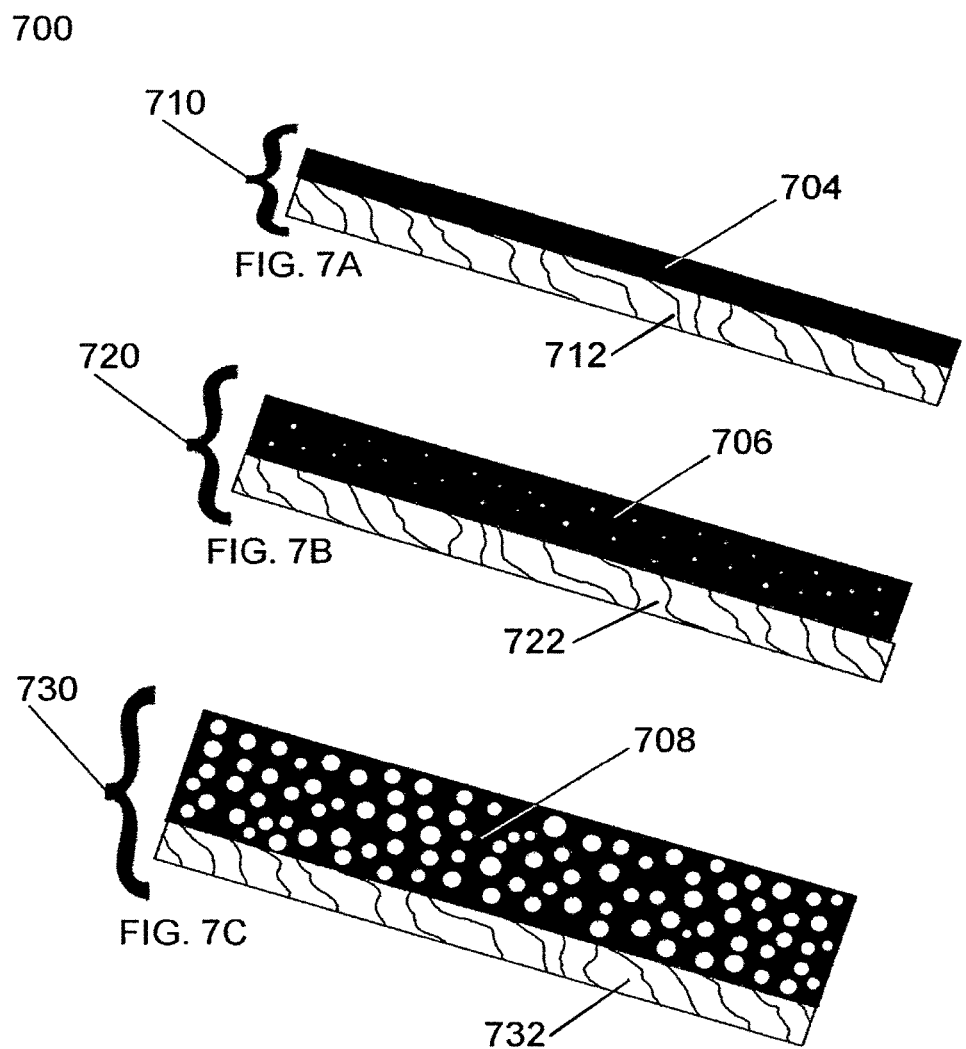
FIGS. 7A, 7B, and 7C are representations of cross sections of roofs, according to other embodiments.

Turning to FIGS. 7A, 7B, and 7C, shown are cross-sections of protective layers of a roof, according to several embodiments. In a cross-section 710, a protective membrane, e.g., a plastic non-aqueous plural component polymer layer 704 such as a polyurea, is applied to a roof substrate 712 such as roof shingles, shakes, shingles, or other existing roof layer or roof sheathing. The polymer layer 704 has not been aerated prior to application to the substrate 712. In another cross-section 720, a substrate 722 may be coated with a non-aqueous plural component polymer layer 706 that is aerated by, e.g., an aeration agent or a foaming agent, which may help to promote flow into interstices of the substrate 722 providing increased protection against weathering agents such as moisture. In an embodiment, the aeration agent causes approximately uniform distribution of aeration bubbles (e.g., cavities) within the plural component polymer layer 706. In a cross-section 730, a substrate 732 is coated with a plastic non-aqueous plural component polymer layer 708 that is aerated by, e.g., an aeration agent. The layer 708 may have a greater density of aeration bubbles, as compared with a density of aeration bubbles in the layer 706.

The greater density of aeration bubbles may reduce the mass density of the layer 708 as compared with non-aeration. A reduced mass density of the layer 708 can, e.g., promote flow in the interstices of a substrate that is uneven, has rough surfaces, high density of surface un-evenness, when indicated to promote adhesion due to the composition of the substrate, through empirical testing with the substrate surface, etc. Further, aeration of the layers 706 and 708 may promote thermal insulation of the roof. In an embodiment (not shown), several protective layers of varying aeration density may be applied successively, which may result in an increase in adhesion to a substrate, and increased thermal insulation effect of the roof. Use of aeration in one or more plural component polymer layers may apply to non-sloped roofs and to sloped roofs, in various embodiments.

Figure 8:
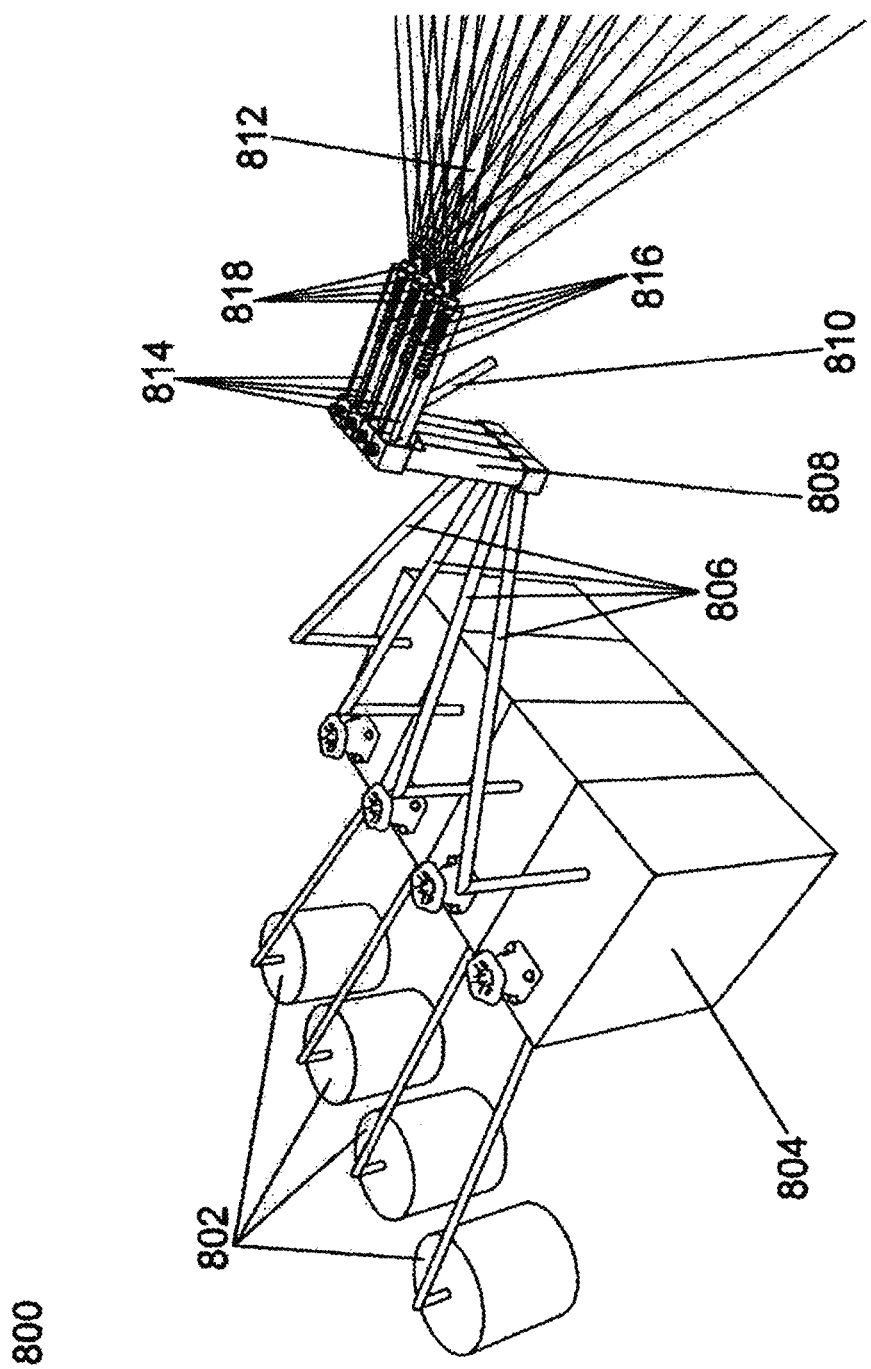
FIG. 8 is representation an apparatus that can be used in making a roof, according to another embodiment.

Turning to FIG. 8, shown is a diagram depicting an apparatus 800 to apply, e.g., a UV-protective topcoat layer as part of a roof retrofit or construction process, according to an embodiment. The apparatus 800 includes one or more reservoirs 802 to store one or more membrane liquids or liquid components, e.g., to be applied to a roof substrate or underlying membrane layer or layers. Liquid in the reservoirs 802 is to be provided to a pump or pumps 804, which may be a compressor(s) or liquid pump(s) that can provide a selectable combination of ingredients stored in the reservoirs 802. For example the reservoirs 802 may provide two liquids that, upon combination on the substrate surface after application by apparatus 800, combine to apply speckled or mottled combination of different shades of color from the reservoirs 802, to be applied to a roof surface. The pump(s) 804 may be programmable to provide a selectable pressure and/or proportion of ingredients stored in the reservoirs 802 that enables adjustment of color of the speckled color combination. For example, the reservoirs may include a plurality of selectable colors to enable an operator to select a color mixture of the membrane (e.g., outermost layer) to be applied to a roof surface, such as an existing roof, or to a roof substrate. Feed lines 806 may provide the output of the pump(s) 804 to each of one or more corresponding spray gun cylinders 814, each of which is to supply a corresponding ingredient to a respective spray gun seat and needle assembly 816 that in turn supply the ingredient to a corresponding tip 818 with a corresponding spray orifice. The spray gun cylinders, seat and needle assemblies, tips and orifices may be included in a spray gun apparatus that includes a spray actuator 810 and handle 808 to enable the user to apply a selectable combination of ingredients to the roof substrate (not shown). For example, the spray actuator 810 may enable selection of the combination of ingredients, selection of proportion of each ingredient in an application mix, and may enable addition of aeration agent(s) (and/or foaming agents) prior to application to the roof surface. The resulting mixture may be sprayed onto the roof substrate in a spray pattern 812 that may be mechanically determined (e.g., selectable) by the user. The apparatus 800 and variations thereof may be used in construction and/or retrofit of sloped roofs and non-sloped roofs, in various embodiments.

Figure 9:
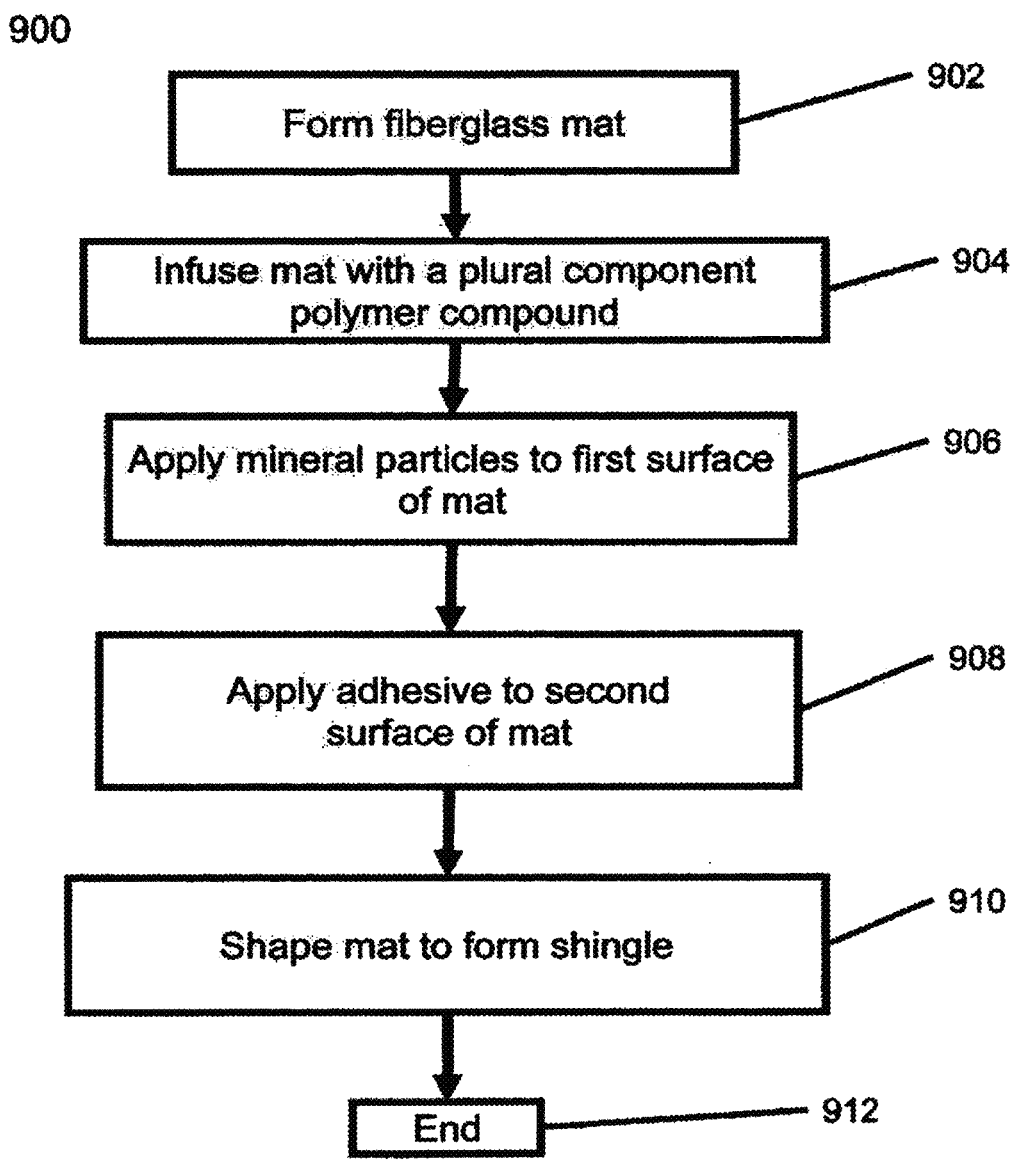
FIG. 9 is a flow diagram of a method of making shingles, according to an embodiment.

Turning to FIG. 9, shown is a flowchart of a method of making roof shingles, according to an embodiment. At block 902, a fiberglass mat may be formed from, e.g., a slurry of fiberglass fibers. Continuing to block 904, the mat may be infused with a plural component polymer, such as a polyurea compound. Advancing to block 906, mineral particles (e.g., aggregate or other granular material) may be applied to a first surface of the infused mat that is to serve as an outer surface. Moving to block 908, an adhesive, e.g. petroleum-based tar or other heat sensitive adhesive, may be applied to a second surface of the mat, so that when affixed to a roof substrate, the adhesive can cause adhesion to the roof substrate due to heat absorption from, e.g., solar rays. Proceeding to block 910, the treated mat is shaped to form a finished shingle. The method ends at 912.

Figure 10:
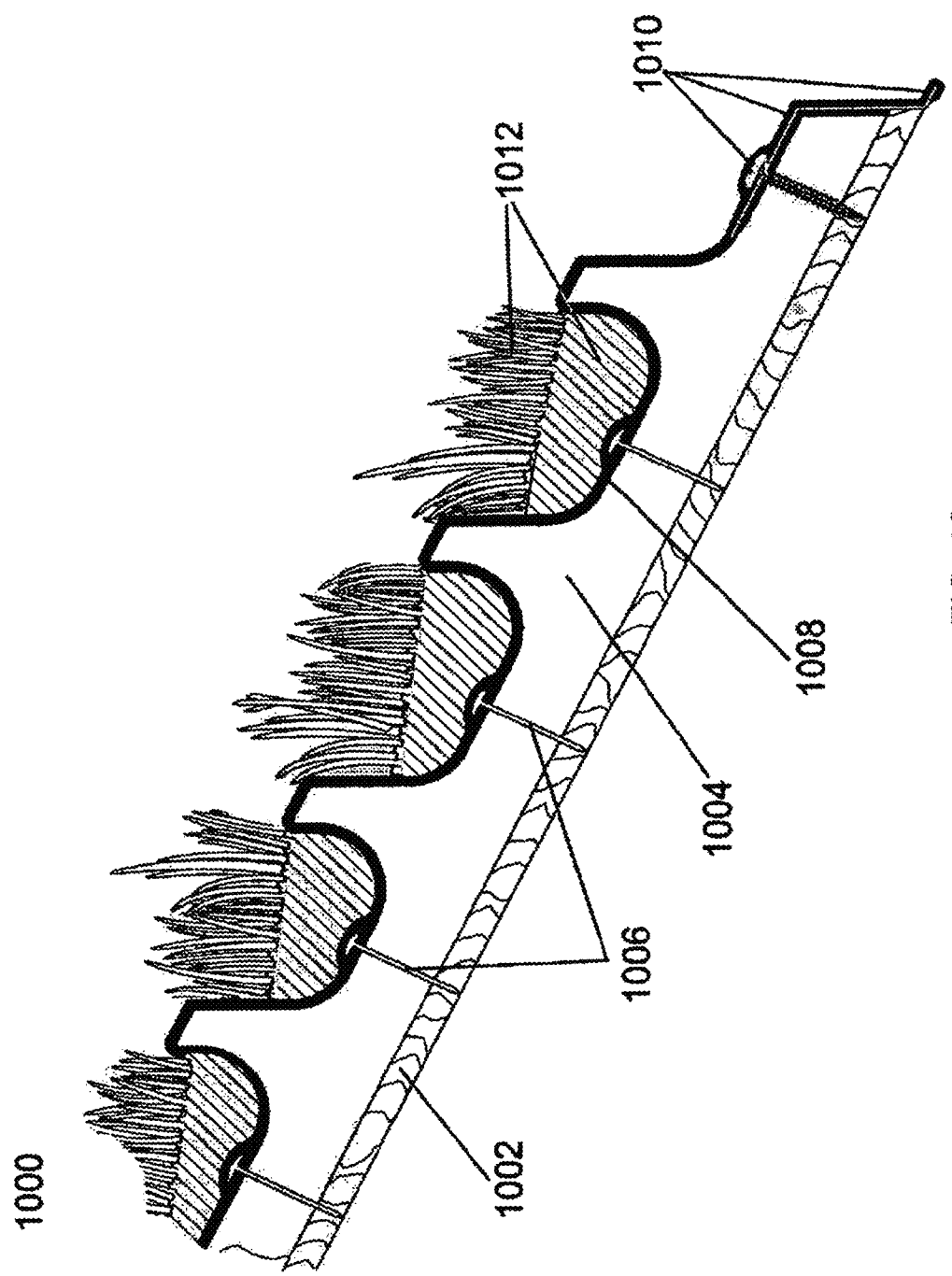
FIG. 10 is representation of a roof, according to another embodiment.

Turning to FIG. 10, shown is a cross-sectional diagram of a roof 1000, according to an embodiment. The roof 1000 includes a roof substrate 1002, shaped panels 1004, e.g., shaped foam such as a polystyrene foam, fasteners 1006, e.g., mechanical, adhesive, or other fasteners to fasten the shaped panels 1004 to the roof substrate 1002, protective membrane 1008 such as a non-aqueous plural component polymer membrane applied in liquid form that can harden to form a moisture-resistant layer, optionally including a color filter layer, e.g., an ultraviolet filter layer, and an integrated edge flashing 1010 that may be sandwiched within the protective membrane 1008, according to embodiments described herein. Additionally, a plant growth medium 1012, e.g., soil, sod, peat moss, etc., may be placed above the protective membrane 1008, e.g., within one or more depressions in the shaped panel 1004. The plant growth medium 1112 may enable the roof to support growth of plants including edible vegetation, which may provide a source of food, and other benefits such as roof run off water management, and other environmental benefits attributed to "green roof technology." Such "green roof technology" may be especially useful in urban applications where agricultural space is limited, and this embodiment extends a concept of planted green roofs to sloped roof structures.

Turning to FIG. 11, shown are roofs of two structures. A first structure 1110 has a conventional roof with a plurality of vents 1102, which are typically installed to prevent dry rot and other deleterious effects of moisture seepage into an attic due to porosity of the roof.

A second structure 1120 has another roof including a membrane layer according to embodiments such as shown in FIGS. 1 and 2, and includes fewer vents 1104 than in the conventional roof of the first structure 1110. The second structure 1120 may have fewer vents than the first structure 1110 due to protection against moisture seepage provided by the protective membrane that is a non-aqueous plural component polymer material, such as a polyurea compound, and that can be applied in liquid form that hardens rapidly after application. Embodiments may employ rapid hardening compounds including plural component polymer materials that harden in a temporal range of several seconds to several minutes after application. Such rapid hardening materials may be suitable for application to sloped roofs, because the material will not significantly shift (e.g., slide downward) before hardening, and so substantial uniformity of thickness is more easily achieved than with use of a membrane material having a long hardening time, e.g., in excess of 15 minutes.

Fewer vents can translate to energy savings due to less heat needed in cold weather, and less air conditioning needed in warm weather. A water-resistant membrane thus permits a reduction in building envelope venting, with consequent energy savings.

Embodiments presented herein may be applicable to sloped roof systems, and to non-sloped roof systems. While the present invention has been described with respect to a limited number of embodiments, those skilled in the art will appreciate numerous modifications and variations therefrom. It is intended that the appended claims cover all such modifications and variations as fall within the scope of the present invention.

What is claimed is:

1. A roofing apparatus comprising:
a first plural component polymer layer that directly contacts and coats generally an entirety of an outer surface of a roof substrate having a roof pitch that exceeds 3/12, wherein the first plural component polymer layer forms a generally seamless and continuous first membrane; and
one or more flashing members including a first flashing member that is one of a drip edge flashing member and a rake edge flashing member and that has a first flashing member first portion and a first flashing member second portion, wherein an internal surface of the first flashing member first portion directly contacts a first peripheral portion of the first plural component polymer layer and is attached to a perimeter of the roof substrate by at least one mechanical fastener so that the first peripheral portion of the first plural component polymer layer lies between the internal surface of the first flashing member first portion and a corresponding peripheral portion of the roof substrate, wherein the first flashing member second portion extends beyond the perimeter of the roof substrate and the first flashing member second portion lacks direct contact with the first plural component polymer layer and a second plural component polymer layer directly contacts generally an entirety of an external surface of the first flashing member first portion and at least a portion of the first plural component polymer layer so that the first flashing member first portion is embedded between the first plural component polymer layer and the second plural component polymer layer.

2. The apparatus of claim 1, wherein the roof substrate includes at least one plastic panel that comprises polystyrene and that forms a portion of the outer surface of the roof substrate.

3. The apparatus of claim 1, wherein the second plural component polymer layer is further to coat a portion of at least one of the at least one mechanical fastener.

4. The apparatus of claim 1, wherein the first plural component polymer layer has an associated hardening time that is less than approximately 10 minutes.

5. The apparatus of claim 1, wherein the first plural component polymer layer has an associated hardening time that is less than approximately 1 minute.

6. The apparatus of claim 1, wherein the first plural component polymer layer includes an aeration agent.

7. The apparatus of claim 1, wherein upon attachment to the roof substrate the first flashing member is to anchor the first plural component polymer layer to the roof substrate so as to impede separation of the first plural component polymer layer from the roof substrate.

8. The apparatus of claim 1, wherein at least one of the first plural component polymer layer and the second plural component polymer layer comprises polyurea.

* * * * *